June 14, 1960  R. H. BRANDES ET AL  2,940,426
VOLUME COMPENSATING MEANS FOR A SERVO SYSTEM
Filed June 3, 1953  4 Sheets-Sheet 1

INVENTORS
ROY H. BRANDES
BY OREN F. FLAUGH
Craig V. Morton
ATTORNEY

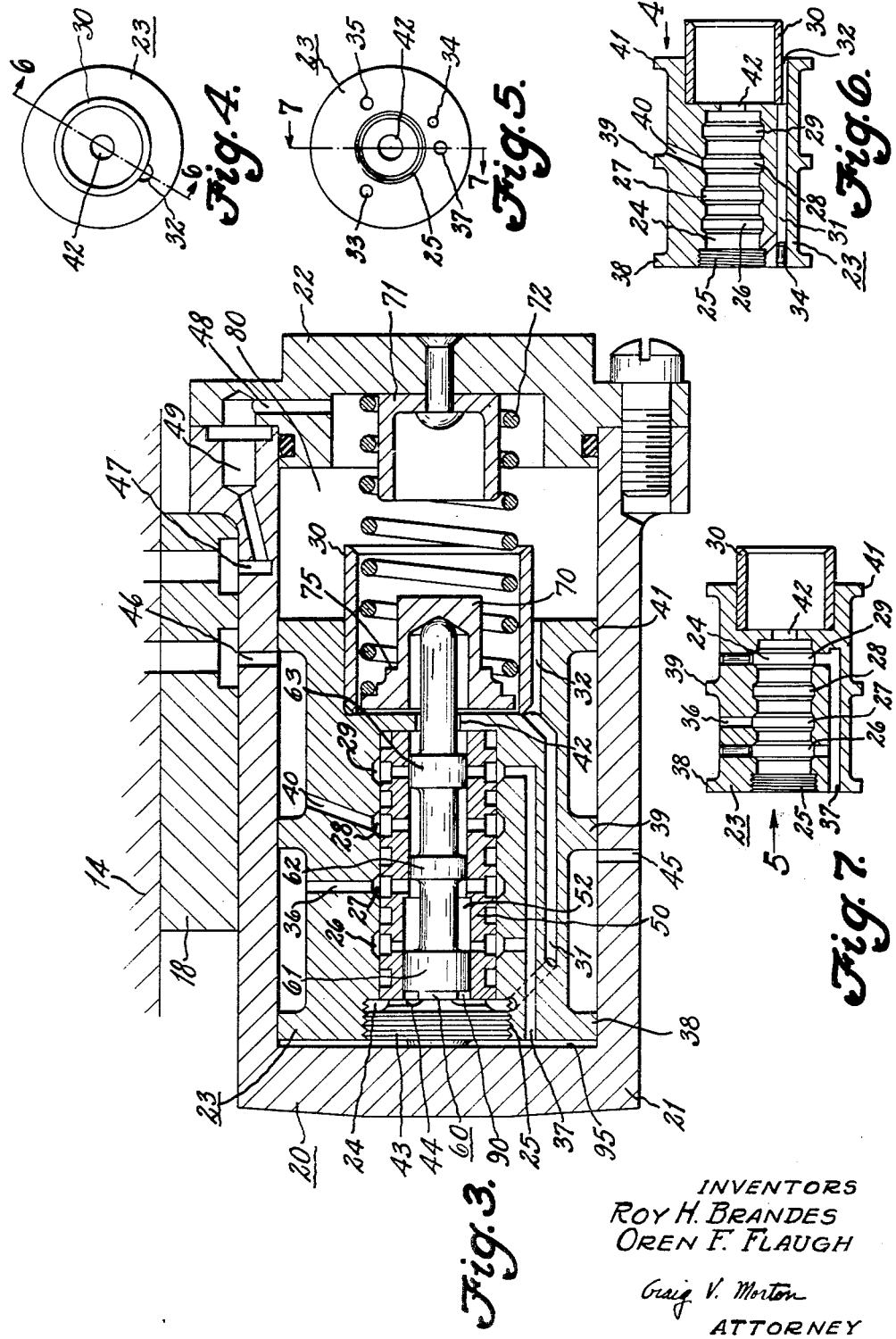

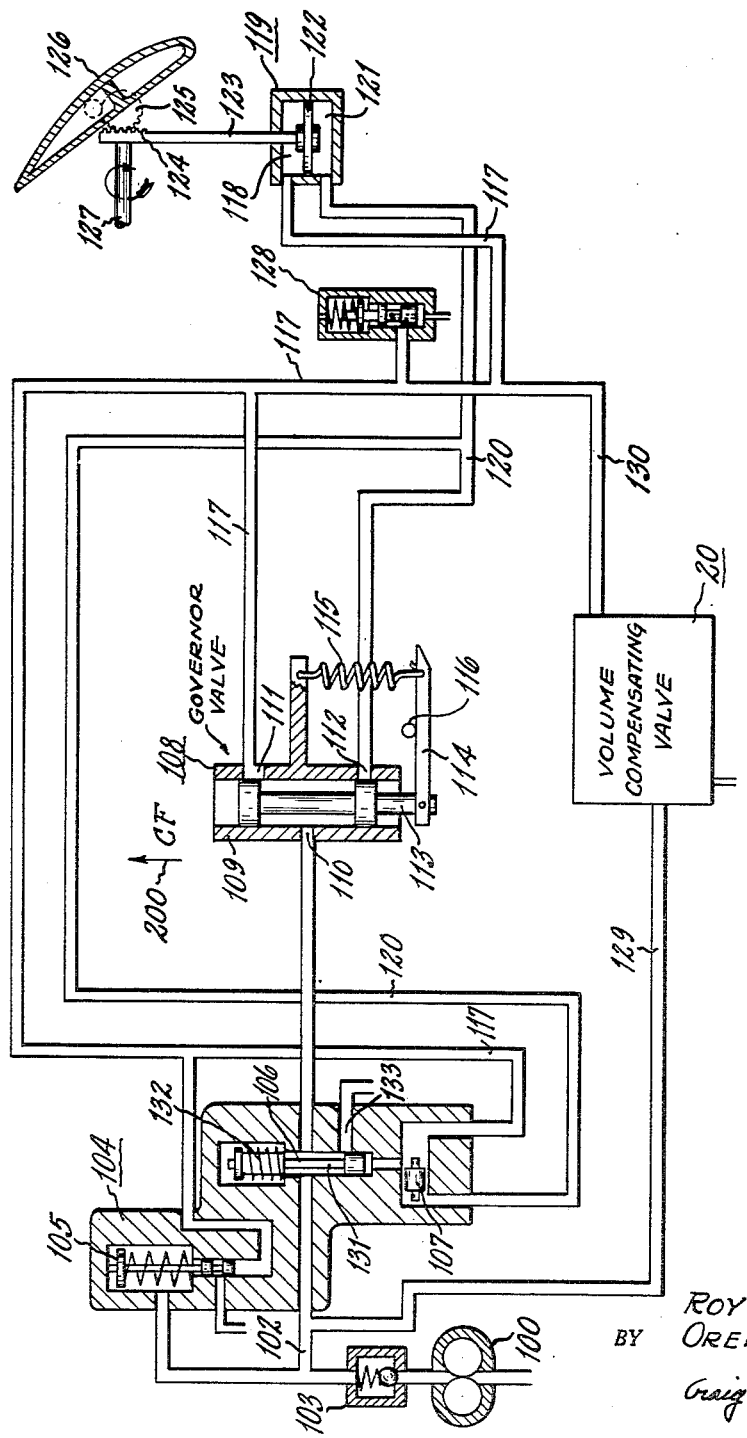

INVENTORS
ROY H. BRANDES
BY OREN F. FLAUGH

Craig V. Morton
ATTORNEY

2,940,426

VOLUME COMPENSATING MEANS FOR A SERVO SYSTEM

Roy H. Brandes and Oren F. Flaugh, Dayton, Ohio, assignors to General Motors Corporation, Detroit, Mich., a corporation of Delaware Filed June 3, 1953, Ser. No. 359,306

5 Claims. (Cl. 121—38)

The present invention pertains to volume compensating means for a servo system wherein the volume of the fluid in the servo system is subject to change due to the compressibility thereof.

Heretofore, in servo systems employing a fluid, such as oil, no provisions were made to compensate for the volume changes due to the compressibility of the fluid. However, it is a recognized fact that hydraulic fluids, though ordinarily considered incompressible, are subject to definite volume changes under high pressure loading. The phenomenon of liquid compressibility presents a rather serious problem in servo systems where precise control is a requisite. Moreover, the failure of accurate control in servo systems, particularly those operated under high pressure, has been attributed to the compressibility of the fluid employed. Accordingly, among our objects are the provision of means to compensate for the compressibility of the fluid employed in a servo system; the further provision of automatically operable means to compensate for the compressibility of fluid in a servo system; and the still further provision of a volume compensating valve assembly for supplying a predetermined volume of fluid to a servo system to offset the volume loss in the system due to the compressibility of the fluid employed.

The aforementioned and other objects are accomplished in the present invention by providing means for injecting an adidtional volume of fluid into the servo system when movement of a servo motor in the direction opposed to the direction of external loading is desired. Specifically, the mechanism of this invention is particularly adapted for use in conjunction with a servo system for controlling the pitch position of variable pitch propeller blades of the type disclosed in copending application, Serial No. 273,806, filed February 28, 1952, in the names of Richard E. Moore and Dale W. Miller, now U.S. Patent 2,745,500, but it is to be understood that this adaptation is only exemplary.

A typical servo system for propeller blade pitch control may include, as herein schematically disclosed, a source of fluid pressure, pressure regulating means, a governor controlled valve, a servo-motor, the volume compensating valve assembly of this invention, and various other necessary adjuncts known in the art. In propeller mechanism of the aforementioned copending application, external aerodynamic and centrifugal loading of the propeller blades during rotation of the propeller tends to turn the propeller blades about their longitudinal axes toward a lesser pitch position, this phenomenon being caused by the inherent structural characteristics of the blades. Accordingly, a substantially greater fluid pressure is required to increase the blade pitch position, than is required to decrease the blade pitch position. In addition by reason of the friction between relatively movable parts of the blade adjusting servo-motor, only a rather small pressure potential is required to maintain the blades at a relatively constant angle during constant speed propeller operation under the control of the governor operated valve. Inasmuch as the external blade loading forces assist blade movement toward a lesser pitch position, a relatively insignificant pressure potential is required to effect fluid pressure actuation of the servo-motor piston in one direction, while an appreciably greater pressure potential is required to effect fluid pressure actuation of the servo-motor piston in the opposite direction.

Thus, the problem of compressibility of the fluid medium, in this instance oil, does not exist when the servo system is actuated to decrease blade angle, but does manifest itself when the servo system is actuated to increase blade angle. Accordingly, the volume compensating valve assembly of this invention is only employed to supply a predetermined quantity of additional fluid into the system when the governor operated valve senses and demands an increase in blade angle. With this understanding, it will be readily apparent that a servo actuated valve, having a chamber containing a predetermined volume of fluid, calculated to compensate for the volume loss due to compressibility of the fluid in the servo-motor caused by high pressure and expansion of the servo-motor cylinder, which valve is automatically operable to inject any, or all, of its stored volume of fluid into the system when an increase in blade angle is demanded, will perform the desired function. The quantity of fluid injected into the system by the volume compensating valve assembly varies with the potential of pressure applied to the servo-motor in demanding an increase in blade angle. That is, if the pressure potential demanded by the servo-motor is the maximum pressure potential available in the system, the entire stored volume of the compensating valve will be injected into the system, while if the servo-motor demands a pressure less than the maximum available pressure potential of the system, the volume of fluid injected into the system by the compensating valve will be proportionally smaller. In the instant invention the volume compensating valve injects part, or all, of its stored volume of fluid in response to a demand by the governor control valve for an increase in the blade angle position of the propeller blades, and after the governor valve has been satisfied, the volume compensating valve will automatically take back from the system the volume of fluid it had previously injected into the system, to thereby condition itself for the next succeeding demand by the governor valve for an increased blade angle.

Further objects and advantages of the present invention will be apparent from the following description, reference being had to the accompanying drawings wherein a preferred embodiment of the present invention is clearly shown.

In the drawings:

Fig. 3 is an enlarged composite sectional view of the volume compensating valve assembly, in the inoperative position.

Fig. 4 is an end view of the volume compensating valve piston taken in the direction of arrow 4 in Fig. 6.

Fig. 5 is the opposite end view of the volume compensating valve piston taken in the direction of arrow 5 in Fig. 7.

Fig. 6 is a sectional view taken along lines 6—6 in Fig. 4.

Fig. 7 is a sectional view taken along lines 7—7 in Fig. 5.

Fig. 8 is a schematic diagram of a typical servo system incorporating the pressure compensating valve of this invention.

Figure 1:
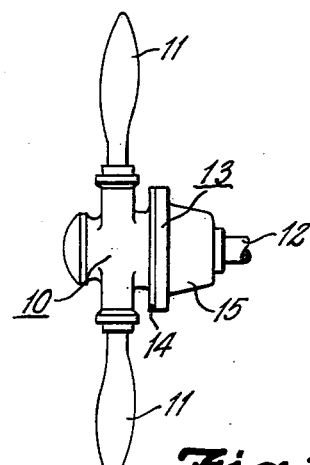
Fig. 1 is a view in elevation of a variable pitch propeller including a regulator housing a fluid pressure system having a volume compensating valve assembly constructed according to this invention.

With particular reference to Fig. 1 of the drawings, a propeller assembly is shown including a propeller hub 10 having a plurality of radially extending sockets within which propeller blades 11 are journaled for rotation about their longitudinal axes. The propeller hub is attached to and driven by a shaft 12, which is adapted to be rotated by any suitable power plant, not shown. Attached to and rotatable with the hub 10 is a regulator assembly 13. The propeller assembly may be of the type disclosed in the Blanchard et al. Patents 2,307,101 and 2,307,102 wherein individual fluid pressure operated servo-motors are operatively associated with the root ends of the propeller blades 11 to effect pitch shifting movements thereof, under the control of a fluid pressure system disposed within the regulator 13.

Figure 2:
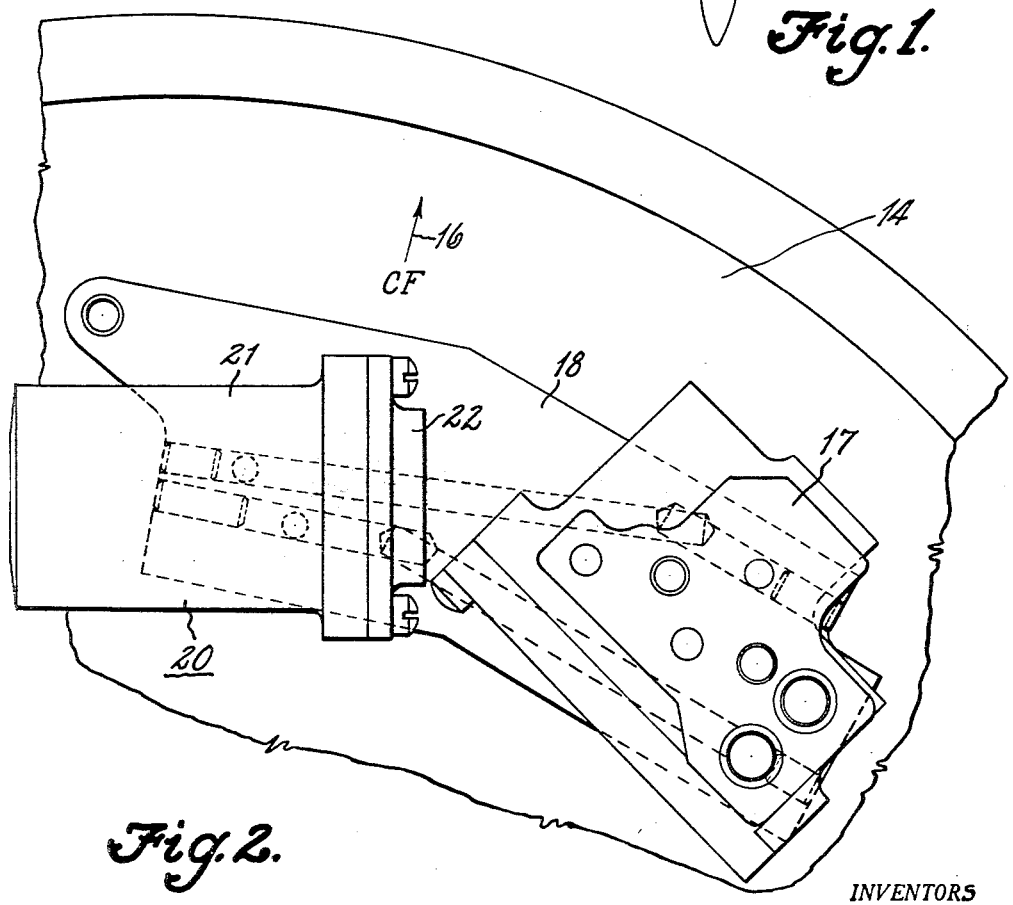
Fig. 2 is an enlarged fragmentary view in elevation of a portion of the regulator shown in Fig. 1 with the cover removed.

The regulator 13 includes a front plate 14 and a cover 15. Various component parts of the fluid pressure system are mounted on the front plate 14 and passage means are provided in the hub 10 for conveying fluid under pressure from the regulator to the blade actuating servo-motors, in accordance with the aforementioned patents. As is shown in Fig. 2, the volume compensating valve assembly 20 of this invention is mounted on the front plate 14 with the greatest dimension thereof disposed at substantially right angles to the direction of centrifugal force indicated by arrow 16. A pressure control valve assembly 17, which constitutes the pressure regulating means of the fluid pressure system is also shown attached to the front plate 14, and, as will be alluded to hereinafter, the pressure control valve assembly 17 contains plungers, which are responsive to centrifugal force and, accordingly, are mounted with their axes in alignment with radius lines from the center of the front plate 14.

With reference to Fig. 3, the construction of the volume compensating valve 20 will next be described. The volume compensating valve is rigidly attached to an adapter plate, or mounting pad, 18, which is, in turn, attached to the regulator front plate 14. The valve assembly 20 includes a casing 21, which constitutes a cylinder having a head member 22 attached to one end thereof by any suitable means, such as bolts. Suitable sealing means are also provided between coengaging surfaces of the head member 22 and the cylinder housing 21 to prevent the leakage of fluid from the interior of the cylinder. A piston 23 is disposed within the cylinder housing 21 for reciprocable movement. The piston 23 is shown in detail in Figs. 4 through 7 and comprises a member having a longitudinal through bore 24. One end of the through bore is threaded at 25 and the through bore is of stepped configuration. The through bore is also provided with a plurality of annular grooves 26, 27, 28 and 29, the function of which will be described hereinafter. A spring guide 30 is disposed in a counterbored portion of the through bore 24, and is fixedly retained therein by any suitable means, not shown.

As is shown in Figs. 4 and 6, the piston 23 includes a passage 31, which connects the threaded portion 25 with a passage 32 located adjacent the exterior surface of the spring guide 30. As is shown in Fig. 5, the piston 23 also includes three longitudinal passages 33, 35 and 37, which are open to the end of the piston having the threaded portion 25. The passages 33, 35 and 37 are connected by further passage means in the piston 23 to annular channels 26 and 29, in the manner passage 37 is shown so connected in Fig. 7. The end of passage 31 adjacent the threaded portion 25 is closed by a plug 34, as is shown in Figs. 5 and 6. Annular channel 27 within the bore 24 of the piston is connected by a passage 36 to an annular channel formed between exterior annular shoulders 38 and 39 of the piston 23. Annular channel 28 of the through bore 24 is connected by a passage 40 to an annular channel formed between exterior annular shoulders 39 and 41 of the piston 23, as is shown in Fig. 6. The counterbored portion of the piston 23 is connected to the portion of the through bore 24 having the annular grooves 26 through 29 by means of an opening 42.

Referring again to Fig. 3, a valve sleeve 50 having a stepped through bore 52 is rigidly retained within the through bore 24 of the piston 23 by means of a threaded device 43, which engages the threaded portion 25 of the piston 23 and forces the sleeve 50 into abutting relation with the annular flange of the piston surrounding opening 42. Portions of the threaded device 43 are relieved, as at 44, to permit communication between passage 31 and the larger diameter portion of the stepped bore 52. In addition, the sleeve 50 is provided with a plurality of sets of circumferential openings which interconnect the annular channels 26 through 29 of the piston 23 and the stepped bore of the sleeve.

A three-land plunger 60, or pilot piston, is disposed within a stepped bore of the sleeve 50 for reciprocable movement relative thereto. The plunger 60 includes a single land 61 which is adapted for movement within the larger diameter portion of the stepped bore of the sleeve 50, and a pair of spaced lands 62 and 63, which are disposed within the smaller diameter portion of the stepped bore of sleeve 50. Land 62 is employed to prevent communication between the larger and smaller diameter portions of the stepped bore of sleeve 50. Land 61 is disposed to control the flow of fluid from passages 33, 35 and 37 to passage 36 and the annular channel between piston shoulders 38 and 39. Land 63 is adapted to control the flow of fluid from the annular channel between piston shoulders 39 and 41 through passage 40 to the passages 33, 35 and 37. The annular channel between lands 38 and 39 is always connected with a port 45 in the housing 21, while the annular channel between shoulders 39 and 41 is always connected to a port 46 in the cylinder housing.

One end of the plunger 60 extends through the opening 42 and engages a spring seat 70 situated within the spring guide 30. The inner surface of the head member 22 also supports a spring guide 71. A compression spring 72 circumscribes the spring guide 71 and is disposed within the spring guide 30, opposite ends of the spring seating respectively against the inner wall of the head member 22 and the spring seat 70. Normally, the spring 72 maintains the plunger 60 in abutting relation with the threaded device 43, as shown in Fig. 3.

The cylinder housing 21 is of sufficiently greater longitudinal extent than the piston 23 to provide a chamber 80 between the counterbored end of the piston 23 and the head member 22. The volume of the chamber 80 is such a volume as will compensate for the volume of fluid lost in a servo system due to compressibility of the fluid medium, at the greatest available pressure potential. For instance, in a propeller construction of the type disclosed in the aforementioned copending application, Serial No. 273,806, the volume of chamber 80 is approximately one cubic inch. The chamber 80 is in communication with passage 32 and passage 31 of the piston 23. The chamber 80 also communicates with a port 47 in the housing 21 by means of passage 48 in the head member 22 and passage 49 in the housing 21.

As heretofore alluded to, the phenomenon of liquid compressibility has manifested itself in servo controlled systems. This phenomenon is particularly apparent in hydraulically controlled variable pitch propellers, in which centrifugal and aerodynamic forces externally load the servo-motor, or motors, in one direction, which may either tend to increase the blade angle, or decrease the blade angle, dependent upon the inherent characteristics of the propeller blades. In propeller constructions of the type disclosed in the aforementioned copending application, Serial No. 273,806, the external forces tend to reduce the blade pitch position. With reference to Fig. 8, a simplified schematic fluid pressure system is depicted for actuating a servo-motor. The servo-motor in this instance is connected to a propeller blade for varying the pitch position thereof, but it is to be understood that the volume compensating valve assembly of this invention can be incorporated in any fluid pressure system wherein precise control of the servo-motor is a requisite, and wherein the pressure loadings are such as to cause compressibility of the fluid medium employed.

The fluid pressure system of Fig. 8 includes a high pressure pump 100 having an inlet in communication with a reservoir, not shown, and an outlet connected to a high pressure line 102 through a check valve 103, which prevents flow from the line 102 back through the pump. If the servo system is employed for controlling the pitch of propeller blades in accordance with the teachings of the aforementioned Blanchard et al. patents, the reservoir is formed by the regulator housing and the pump 100 is driven upon rotation of the propeller inasmuch as the regulator includes a fixed adapter assembly, not shown, about which the front plate and cover 15 rotate. The fluid pressure system includes a pressure control valve assembly 104, which may be constructed in accordance with the teachings of the aforementioned copending application, Serial No. 273,806, and, thus, includes a pressure relief valve 105, an equal area valve 106 and a shuttle valve 107. The high pressure supply line 102 is connected to a supply port of a governor controlled valve 108, which includes a valve sleeve 109 having a supply port 110 and a pair of outlet ports 111 and 112. Disposed within the sleeve 109 is a reciprocable plunger 113 having spaced lands, which cooperate with the ports 111 and 112. One end of the plunger 113 is pivotally connected to the end of a lever 114, the opposite end of which is connected by means of a tension spring 115 to a fixed portion of the valve sleeve 109. An intermediate point of the lever 114 is maintained in engagement with a movable fulcrum 116 by the spring 115 so that the spring 115 ordinarily urges the plunger 113 downwardly, as viewed in Fig. 8. As is readily apparent, the mechanical advantage of lever 114 may be varied by moving the fulcrum 116 along the lever 114.

Port 111 of the valve sleeve is connected with a line 117, which, in turn, is connected to an increase pitch chamber 118 of a servo-motor 119. Port 112 is connected to a line 120, which, in turn, is connected to a decrease pitch chamber 121 of the servo-motor 120. As schematically shown in Fig. 8, the servo-motor 119 includes a cylinder within which a piston 122 is disposed, the piston being capable of fluid pressure actuation in either direction. The piston 122 is shown having a rod 123 extending through an end wall of the servo-motor cylinder, the rod 123 having formed thereon a rack 124. The rack 124 meshes with a pinion gear 125 shown schematically connected to a propeller blade 126 for effecting rotation thereof about its longitudinal axis. The propeller blade 126 is also shown as being operatively associated with an engine shaft 127, which may be rotated in the direction of the arrow.

The line 117 also connects with a constant leak valve 128, the function of which is more particularly described in copending application, Serial No. 273,806. Lines 117 and 120 also connect with opposite sides of the shuttle valve 107, and in addition, line 117 is connected to the pressure relief valve 105. The respective functions of the relief valve 105 and the constant leak valve 128 will not be dealt with in this application. The volume compensating valve 20 is shown having connection with line 102 by means of line 129 and with line 117 by means of line 130. In Fig. 8, the direction of centrifugal force is indicated by the arrow 200 and by comparing the several figures of this application, it will be apparent that centrifugal force has virtually no effect upon the position of the several elements of the volume compensating valve assembly inasmuch as the volume compensating valve assembly 20 is mounted on the front plate 14 so that the movable elements thereof are disposed at substantially right angles to the direction of centrifugal force.

With particular references to Figs. 3 and 8, when the volume compensating valve assembly is incorporated in a servo system of a variable pitch propeller, the port 46 of the housing 21 is connected to the line 129 and the line 102 of Fig. 8 and the port 47 is connected to the increase pitch line 117 by line 130. Thus, the maximum pressure potential of the fluid pressure system is at all times communicated to annular channel 28 of the piston 23 through port 46 and passage 40, while the pressure potential of fluid applied to the increased pitch chamber 118 is at all times communicated to the volume chamber 80 through port 47 and passages 48 and 49.

It is deemed necessary to briefly describe the operation of the equal area valve 106 and the shuttle valve 107 in the servo system of Fig. 8, in order to comprehend the operation of the volume compensating valve 20. The pressure potential in lines 102 and 129 is controlled by the position of the equal area valve plunger 131. Presupposing that the governor controlled valve is in the position shown in Fig. 8, the propeller can be considered to be rotating at the selected speed, in which instance, it is desired to maintain the pitch position of the propeller blade 126 substantially constant, or fixed. In order to accomplish the maintenance of a predetermined pitch position, the increase pitch chamber 118 is pressure loaded by reason of the fact that in the equilibrium position of the governor controlled plunger 113, a predetermined amount of flow passes through line 117 through the constant leak valve 128 to drain. The pressure loading of increase pitch chamber 118 necessary to maintain a predetermined pitch position of the blade 126 may be on the order of 200 p.s.i. This pressure of 200 p.s.i. is reflected in line 117 and moves the shuttle valve element so that line 117 communicates with the equal area valve plunger 131. The pressure on the lower side of equal area valve plunger 131 is assisted by centrifugal force and a spring 132 in tending to move the plunger 131 upwardly, while upward movement of the plunger 131 is opposed by the pressure potential in line 102 acting on the upper side of plunger 131. The valve 106 is termed an equal area valve inasmuch as the areas on opposite sides of the land of plunger 131 are equal since the pressure in line 102 is communicated to the chamber for the spring 132 and acts on the plunger rod, as well as the upper surface of the plunger land. It has been determined that a pressure potential of 200 p.s.i., in line 117, will result in a pressure potential of approximately 650 p.s.i. in line 102, with the construction as shown. The 450 p.s.i. differential between lines 102 and 117 is accounted for by fluid friction losses. Accordingly, a pressure potential of 650 p.s.i will be communicated to the annular channel 28 of the piston 23 in the volume compensating valve 20, while a pressure potential of 200 p.s.i will exist in volume chamber 80. If the governor valve demands an increase in the blade angle position of the propeller blade 126, the pressure potential applied to the increase pitch chamber 118 will be in accordance with the demand of the governor valve 108.

Thus, if the plunger 113 moves upwardly in Fig. 8 to fully open port 111 to port 110, while port 112 is connected to drain, the maximum available pressure potential of the pump 100 will be demanded. In this instance, the pressure potential in line 117 will move the equal area valve plunger 131 to close the pressure relief port 133, whereby the pressure potential in line 102 will be increased to its maximum value. In a propeller construction of the type disclosed in Serial No. 273,806, the maximum variable pressure potential in line 102 is on the order of 3450 p.s.i., which after subtracting the fluid friction losses of 450 p.s.i., results in a net variable pressure potential for actuating the servo-motor 119 of 3000 p.s.i. Accordingly, when governor valve port 111 is fully open, annular channel 28 of the volume compensating valve 20 will have communicated thereto a pressure of approximately 3450 p.s.i. and volume chamber 80 will have communicated thereto a pressure potential of 3000 p.s.i. In positions of the valve plunger 113 between the position shown in Fig. 8 and the fully open position of port 111 due to movement of valve plunger 113 upwardly, the respective pressure potentials, in lines 102 and 117, will be proportional to the amount the port 111 is open.

Inasmuch as, with a propeller construction of the type shown in Serial No. 273,806, the external loading on the propeller blade 126 due to aerodynamic and centrifugal twisting moments, tend to move the blade 126 toward a lesser pitch position, an almost insignificant pressure potential to decrease pitch chamber 121 is required to assist movements of the piston 122 in this direction. Accordingly, when the valve plunger 113 moves downwardly, that is, a condition where the force of spring 115 overcomes the thrust of centrifugal force, the pressure potential applied to line 120 and communicated through the shuttle valve 107 to the equal area valve 106 is insufficient to raise the pressure potential in line 102 above approximately 650 p.s.i. Thus, if port 111 is connected to drain and port 112 is connected to line 102, the pressure required to effect movement of the piston 122 upwardly, as viewed in Fig. 8, will not be sufficient to cause any appreciable compression in the volume of oil in chamber 121.

It has been observed that in servo systems of the character previously described, the compressibility of the oil under pressure loading of 3000 p.s.i. results in a time lag between the time the governor valve demands a change and until the loss of volume due to compression is replaced by flow, no actual movement of the servo-motor piston is accomplished. However, by employing a volume compensating valve assembly, the volume of fluid necessary to replenish the volume loss, due to compressibility, can be injected automatically upon demand of the governor valve so that the time lag heretofore inherent in the system, is obviated. Thus, with the servo system disclosed herein, the fluid under pressure applied by the governor valve is immediately effective to actuate the servo-motor, while the loss in volume due to compressibility is supplied by the volume compensating valve.

*Operation*

The operation of the volume compensating valve will next be described in connection with the servo system shown in Fig. 8, it being understood that the application of the volume compensating valve to a servo system for controlling propeller pitch is only exemplary. It will be assumed in the description of the operation that the governor valve 108 is initially in the equilibrium position, that is, a position wherein a thrust of centrifugal force is equal and opposite to thrust of spring 115 to maintain the plunger 113 in the position shown in Fig. 8. Moreover, with a fluid pressure system in which the pressure potentials in line 117 vary between 200 p.s.i. and 3000 p.s.i., the spring 72 is calibrated to oppose movement of the plunger 60 to the right until a pressure potential of approximately 450 p.s.i. is communicated to servo chamber 90 of the volume compensating valve 20, Figs. 3, 9 and 10. Servo chamber 90 is connected by a passage 31 to passage 32 and the volume chamber 80. The volume compensating valve includes a second servo chamber 95, which has connection with the passages 33, 35 and 37. The area of land 61 exposed to the pressure potential in servo chamber 90 is somewhat greater than the area of land 63 exposed to the pressure in volume chamber 80. Accordingly, spring 72 is compressed sufficiently so that it assists the fluid pressure acting on the end surface of land 63 in opposing movement of the plunger 60 to the right under the urge of fluid pressure in servo chamber 90, below a pressure potential of 450 p.s.i., for example, in chambers 80 and 90, which are interconnected. However, as soon as the pressure in chambers 80 and 90 exceeds 450 p.s.i., the plunger 60 will move to the right, as viewed in Fig. 3, to a position where the combined stress of spring 72, which is compressed by movement of plunger 60 to the right, and the pressure potential acting on the end surface of land 63 again equals the total force of the pressure fluid in servo chamber 90 acting on the area of land 61. Thus, for every pressure potential in chambers 80 and 90 between 450 p.s.i. and 3000 p.s.i., the plunger 60 will assume a position relative to the housing 21 between the position shown in Fig. 3 and the position wherein shoulder 75 of the spring seat 70 engages spring guide 71, Fig. 10.

Figure 9:
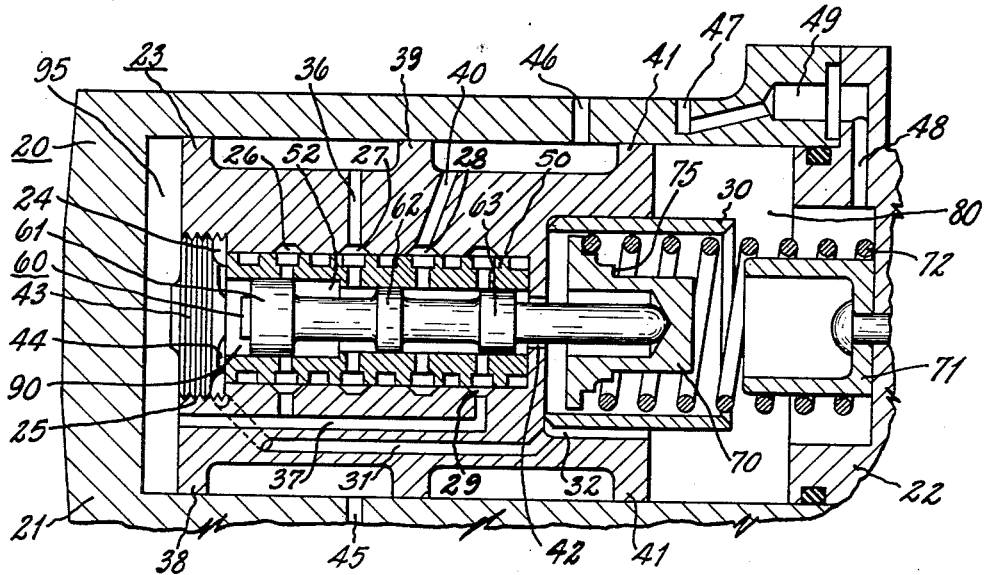
Fig. 9 is a fragmentary composite sectional view of the volume compensating valve assembly in an operative position.

The compressibility of a fluid medium, such as oil, is not appreciable below 450 p.s.i., and, accordingly, volume compensation is not required below pressure potentials of this magnitude. Now assuming that the governor valve plunger 113 moves upwardly, as viewed in Fig. 8, to a position where port 111 is opened wider to the source port 110, and port 112 is opened to drain through the open end of the valve sleeve 109, which means that the governor valve 108 is calling for movement of the blade 126 to an increased blade angle position. As movement of the blade 126 to a higher blade angle position requires movement of servo-motor piston 122 in the direction opposed to the external forces on the servo-motor, compression of the fluid in chamber 118 due to the application of high pressure fluid through line 117, will occur in varying amounts if the pressure potential applied through line 117 is between the limits of 450 p.s.i. and 3000 p.s.i. Obviously, the volume lost in the system between line 117 and chamber 118, due to compression is proportional to the pressure loading, or stated another way, is proportional to the applied pressure potential. If the pressure applied to line 117 and chamber 118 is above 450 p.s.i., for instance 600 p.s.i., as controlled by the equal area valve 106, a pressure potential of 600 p.s.i. will be communicated to chambers 80 and 90 of the volume compensating valve. A pressure potential of 600 p.s.i. in chamber 90 will effect movement of plunger 60 to the right to a position, as is depicted in Fig. 9, where the product of the pressure per unit area in servo chamber 90 times the area of land 61 exposed to the pressure equals the combined forces of the same pressure potential in chamber 80 per unit area times the lesser area of land 63 plus the total force of a spring 72. A pressure potential of 600 p.s.i. in chamber 90 will effect movement of the plunger 60 to the right, as viewed in Fig. 3, sufficiently so that land 63 will at least partially uncover its series of circumferential ports, thereby placing annular channel 28 in communication with annular channel 29. Thus, pressure fluid from line 102, which is at a potential of 600 p.s.i. plus the friction losses, for example, 450 p.s.i., so that a pressure potential of 1050 p.s.i. is communicated through passages 33, 35 and 37 to servo chamber 95. As land 61 of the plunger 60, in moving to the right, also closes the series of ports aligned with annular channel 26, the fluid under pressure flowing through passages 33, 35 and 37 will not flow to drain through annular channel 27, port 36 and port 45.

A pressure potential of 1050 p.s.i. in servo chamber 95 will move the piston assembly 23 to the position depicted in Fig. 9, thereby forcing a volume of oil from the chamber 80 into the line 130 and the line 117 to the increase pitch chamber 118. The volume of oil injected into the system compensates for the loss of volume in the system due to compressibility of the oil and expansion of the servo-motor cylinder. The piston 23 in moving to the right under the urge of fluid pressure in servo chamber 95 results in a follow-up movement of the sleeve 50 relative to the plunger 60. However, the follow-up is never sufficient to completely connect servo chamber 95 to drain through passages 33, 35 and 37, annular channels 26 and 27, and ports 36 and 45. Likewise, the follow-up of the sleeve 50 with respect to the plunger 60 is never sufficient to completely block communication between annular channels 28 and 29, if the plunger 60 has been moved to the right by pressure fluid in servo chamber 90. Thus, the piston 23 will move to the right tending to follow-up movement of the plunger 60, but never equaling the linear movement of the plunger 60, since if the piston 23 moved the same distance as the plunger 60, servo chamber 95 would be connected to drain until the piston 23 reached an equilibrium position as shown in Fig. 9.

Thus, the piston 23 will move to the right a distance sufficient to inject into the system from chamber 80 the volume of fluid required to compensate for the compression of the fluid in the system due to a pressure loading of 600 p.s.i. The relative positions of the plunger 60 and the piston 23, as shown in Fig. 9, will remain the same as long as the governor valve is applying fluid under a pressure of 600 p.s.i. to the chamber 118. However, as soon as the governor valve returns to the equilibrium position shown in Fig. 8, the pressure potential in line 117 will drop to approximately 200 p.s.i. whereupon the spring 72 will move the plunger 60 to the left relative to the piston 23, Fig. 9, whereupon servo chamber 95 will be connected to drain through passages 33, 35 and 37, channels 26 and 27, and ports 36 and 45, in which instance, the piston 23 and the plunger 60 will assume the relative positions shown in Fig. 3. The piston 23 in moving from its adjusted position wherein the volume of chamber 80 is reduced, to the position shown in Fig. 3, will take back the volume of fluid from the system that was injected into the system to compensate for the loss of volume. Thus, the volume compensating valve 20 is automatically operable to reload, or recharge, itself by withdrawing the volume of fluid it injected into the system during pressure loading of the system, when the pressure loading of the system is relieved below 450 p.s.i.

If it is now assumed that the governor valve moves downwardly, as viewed in Fig. 8, whereupon chamber 118 is connected to drain through the open end of valve sleeve 109 and chamber 121 is supplied with pressure fluid from line 102 through line 120, the volume compensating valve will not be actuated, since the pressure potential required to effect movement of the servo piston 122 upwardly, is assisted by the external loading, and, therefore, a pressure potential is not required, which will cause a volume loss due to compressibility. Moreover, as the line 117 is connected to drain, the pressure potential in chamber 80 will not exceed 450 p.s.i., and, consequently, plunger 60 and the piston 23 will remain in the relative positions shown in Fig. 3.

Figure 10:
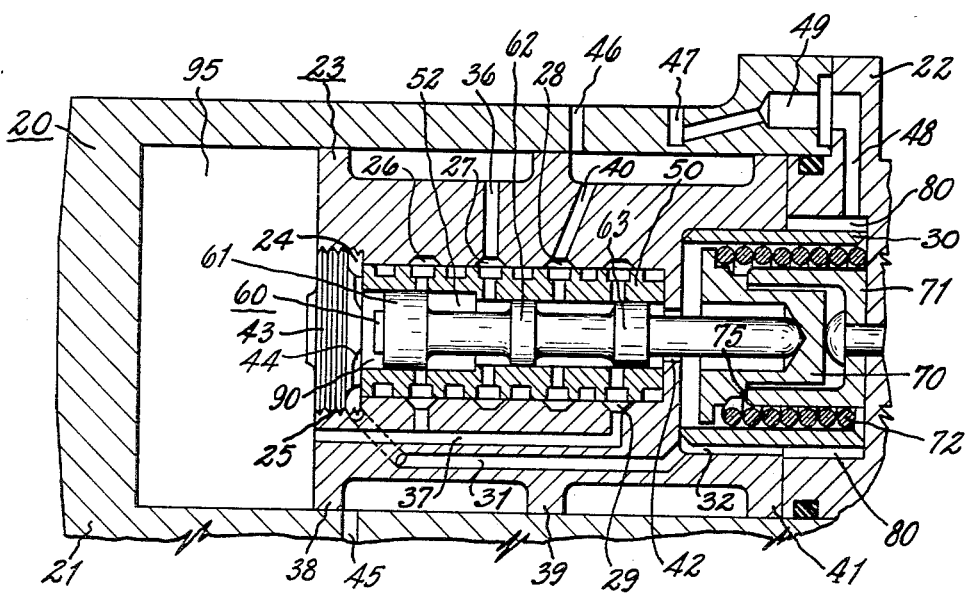
Fig. 10 is a view similar to Fig. 9, depicting another operative position of the volume compensating valve assembly.

Now assuming the governor valve plunger 113 moves upwardly and fully opens port 111 to port 110, and concurrently fully opens port 112 to drain, the governor valve plunger, in so moving, is demanding an appreciable change in the pitch position of blade 126 and, accordingly, the equal area valve 106 may raise the pressure potential in line 117 to 3000 p.s.i. This means that the pressure potential in line 102 communicated through line 129 to the volume compensating valve will be on the order of 3450 p.s.i. In the instant disclosure it has been assumed that the maximum pressure loading will be 3000 p.s.i., and, accordingly, a pressure of 3000 p.s.i. in servo chamber 90 will effect movement of the plunger 60 to the right, as is shown in Fig. 10, so that a pressure potential of 3450 p.s.i. is communicated to servo chamber 95, which will result in movement of the piston 23 to the right until it abuts head member 22, as is shown in Fig. 10. When piston 23 assumes this position, the shoulder 75 of the spring seat 70 will be in engagement with the spring guide 71. However, the relative positions of the plunger 60 and the piston 23 will be such that land 61 blocks communication between annular channels 26 and 27, while land 63 places annular channels 28 and 29 in communication. Accordingly, the volume of fluid supplied from chamber 80 into the system to compensate for the loss of volume due to fluid compression and expansion of the servo-motor cylinder by pressure loading of 3000 p.s.i., will be at a maximum. The piston 23 will remain in abutting relation to head member 22 and the plunger 60 will remain in its right-hand position with spring seat shoulder 75 engaging spring guide 71, as is shown in Fig. 10, until the pressure potential in line 117, which is communicated to the chamber 80, is reduced below 3000 p.s.i., in which instance, the piston 23 and the plunger 60 will move progressively to the left until the pressure below 450 p.s.i. is existent in chamber 80, at which time, the plunger 60 and the piston 23 will assume the relative positions shown in Fig. 3. Thus, the quantity of fluid injected into the system will again be withdrawn when the need for an additional volume due to pressure loading has been removed.

From the aforegoing, it is manifest that the present invention provides a volume compensating valve assembly enabling precise control of a servo-motor, which was heretofore impossible due to the loss of volume in the system caused by compression of the fluid and expansion of the servo-motor cylinder under high pressure loading. Moreover, the volume compensating valve assembly, per se, is of unique construction inasmuch as it is automatically operable to inject the required volume of fluid for different pressure loadings, and withdraw the volume of fluid initially injected into the system when the pressure loading of the system is removed.

While the embodiment of the present invention as herein disclosed, constitutes a preferred form, it is to be understood that other forms might be adopted.

What is claimed is as follows:

1. A volume compensating valve assembly for use with servo systems employing fluids subject to compression under high pressure loading, including, a cylinder, a reciprocable piston disposed in said cylinder capable of fluid pressure actuation in either direction, said piston dividing said cylinder into a fluid storage chamber of predetermined capacity and an actuating chamber, said storage chamber being of a capacity calculated to replenish the system with a volume of fluid equal to the volume loss due to compression of the fluid under maximum pressure loading, and valve means having differential areas subjected to the fluid in said storage chamber and responsive to a predetermined pressure of fluid in said storage chamber for supplying fluid under pressure to said actuating chamber for effecting servo actuation of said piston so as to inject a quantity of fluid from said storage chamber into said servo system upon pressure loading thereof, the magnitude of the volume supplied to said servo system from said storage chamber being dependent upon the magnitude of pressure loading in said servo system.

2. The combination set forth in claim 1 wherein the valve means comprises a servo pilot valve carried by said piston and operable to control the servo actuation of said piston.

3. A fluid compensating valve assembly for use with servo systems employing fluids subject to compression under high pressure loading, including, a cylinder, a reciprocable piston disposed in said cylinder capable of fluid pressure actuation in either direction, a fluid storage chamber of predetermined capacity within said cylinder, one wall of said chamber being formed by a surface of said piston, a stationary valve sleeve carried by said piston, a reciprocable pilot valve disposed in said valve sleeve, resilient means engaging said pilot valve for normally maintaining the said piston and said pilot valve in a predetermined position, said pilot valve having opposed surfaces of unequal areas, passage means connecting the larger area surface of said pilot valve with said storage chamber, the smaller area of said pilot valve also having communication with said storage chamber, and interruptible passage means controlled by said pilot valve for controlling the application of pressure fluid to the other side of said piston when the pressure in said storage chamber reaches a potential which effects movement of said pilot valve under the urge of fluid pressure acting on the larger area of said pilot valve as opposed by said resilient means and the same pressure fluid acting on the smaller area of said pilot valve whereby said pilot valve will apply fluid pressure to the other side of said piston so as to effect follow-up movement thereof and inject a quantity of fluid from said storage chamber into said servo system to compensate for the compression of fluid in said servo system due to pressure loading thereof.

4. The valve assembly set forth in claim 3 wherein said resilient means is disposed in said storage chamber, one end of said resilient means engaging an end wall of said cylinder and the other end if said resilient means engaging a spring seat carried by said pilot valve.

5. A servo system, including, in combination, a servo-motor subject to variable loads, a source of high pressure fluid for actuating said servo-motor, the fluid being subject to compression under high pressure loading, a control valve having fluid connections with said source and said servo-motor for controlling the application of pressure fluid thereto, a volume compensating valve assembly comprising a cylinder having a reciprocable piston therein dividing said cylinder into a storage chamber and an actuating chamber, passage means connecting the storage chamber with said servo-motor, a reciprocable pilot valve carried by said piston and having opposed surfaces of unequal area subjected to the pressure of fluid in said storage chamber, and resilient means disposed in said storage chamber and engaging said pilot valve for normally maintaining the pilot valve and the piston in a predetermined position, said pilot valve having fluid connections with the source and said actuating chamber for directing fluid under pressure from said source to said actuating chamber in response to a predetermined pressure of fluid in said storage chamber to cause movement of said piston and thereby inject a quantity of fluid from said storage chamber into said servo-motor to compensate for the compression of fluid in said servo-motor due to pressure loading thereof.

References Cited in the file of this patent

UNITED STATES PATENTS

| | | |
|---|---|---|
| 2,344,133 | Davis | Mar. 14, 1944 |
| 2,413,439 | Drake | Dec. 31, 1946 |